United States Patent [19]

D'Silva

[11] Patent Number: 5,382,804
[45] Date of Patent: Jan. 17, 1995

[54] COMPACT PHOTOINIZATION SYSTEMS

[75] Inventor: Arthur P. D'Silva, Ames, Iowa

[73] Assignee: CETAC Technologies Inc., Omaha, Nebr.

[21] Appl. No.: 91,253

[22] Filed: Jul. 15, 1993

[51] Int. Cl.⁶ ............................................. G21G 4/00
[52] U.S. Cl. .................... 250/493.1; 250/494.1; 250/504 R
[58] Field of Search ............. 250/493.1, 494.1, 504 R, 250/492.1

[56] References Cited

U.S. PATENT DOCUMENTS

| Re. 33,415 | 10/1990 | Jelic | 313/609 |
|---|---|---|---|
| 2,901,625 | 8/1959 | Friedman et al. | 250/435 |
| 2,943,223 | 6/1960 | Fay | 313/201 |
| 3,390,351 | 9/1963 | Bell | 331/194.5 |
| 3,612,686 | 10/1971 | Braman | 356/86 |
| 3,685,911 | 8/1972 | Dahlquist et al. | 356/86 |
| 3,900,237 | 6/1975 | Marcucci | 316/20 |
| 4,001,624 | 1/1977 | Cosco et al. | 313/185 |
| 4,028,617 | 6/1977 | Kano et al. | 324/33 |
| 4,044,082 | 8/1977 | Rosette | 264/1 |
| 4,225,235 | 9/1980 | Anderson et al. | 356/316 |
| 4,479,075 | 10/1984 | Elliott | 315/111.21 |
| 4,499,406 | 2/1985 | Saburo | 315/57 |
| 4,509,855 | 4/1985 | Gay | 356/72 |
| 4,587,462 | 5/1986 | Buhrer | 315/260 |
| 4,626,744 | 12/1986 | Saburo | 315/57 |
| 4,648,951 | 3/1987 | Maya | 204/157.21 |
| 4,762,402 | 8/1988 | Michon et al. | 350/370 |
| 4,789,783 | 12/1988 | Cook | 250/379 |
| 4,801,209 | 1/1989 | Wadlow | 356/417 |
| 4,853,938 | 8/1989 | Neubauer et al. | 372/65 |
| 4,877,997 | 10/1989 | Fein | 313/634 |
| 4,898,465 | 2/1990 | Crawford et al. | 356/311 |
| 5,062,116 | 10/1991 | Christensen | 372/61 |
| 5,117,150 | 5/1992 | Schwartz et al. | 313/112 |
| 5,126,676 | 6/1992 | Huston | 324/464 |
| 5,168,323 | 12/1992 | Purtschert et al. | 356/313 |
| 5,185,552 | 2/1993 | Subuki et al. | 250/504 R |

OTHER PUBLICATIONS

An MaF₂-No Ion Chamber with O₂ Gas Filter as a Detector of solar H Lyman-F. Radiation; J. . . . E. Sci. Instrum; vol. 13, No. 11, 1980.

Primary Examiner—Bruce C. Anderson
Attorney, Agent, or Firm—James D. Welch

[57] ABSTRACT

Single and multiple photoionization lamp systems contained in machinable photon radiation transparent material such as crystalline magnesium or lithium fluoride are disclosed. A preferred embodiment of a photoionization lamp fabricated in machinable photon radiation transparent material is also disclosed.

7 Claims, 1 Drawing Sheet

COMPACT PHOTOINIZATION SYSTEMS

TECHNICAL FIELD

The present invention relates to photoionization systems and more particularly to a preferred embodiment for compact photon producing lamps, as well as compact multiple photon producing lamp systems which are contained in a block of machinable photon radiation transparent material.

BACKGROUND

Photoionization is a known technique for ionizing sample present in molecular, atomic and/or other fragmental form. Ionized molecules, atoms and/or other fragments can be detected and analyzed in sample analysis systems which utilize electric and/or magnetic fields to direct ionized sample into detectors. Ionization of sample can, for instance, provide electrons which produce a current between two plates that are maintained at different DC potentials when said sample is caused to be ionized between said plates. In addition, electric and/or magnetic field utilizing mass spectrometers can separate ionized sample based upon the mass of said ionized sample when said ionized sample is caused to flow through a present electric and/or magnetic field.

Briefly, photoionization is a process in which photons of a sufficiently short wavelength, produced by a photon production source typically termed a lamp, are caused to interact with sample to cause ionization thereof. A photon producing lamp can be achieved by filling an enclosed space with a gas such as Argon, Krypton or Xenon, which provide photons at 11.8, 10.2 and 9.5 electron-volts (ev) respectively when excited by an electric discharge, for instance. It is mentioned that enclosed spaces in lamps are typically formed from sealed quartz envelopes. It is further noted that, for instance, when Xenon gas is present at low pressures, photons with a wavelength of one-thousand-four-hundred-sixty-five (1465) Angstroms can be produced by causing an electric discharge in said gas, and when Krypton gas is present at low pressures photons at a wavelength of one-thousand-two-hundred-thirty-five (1235) Angstroms can be likewise produced and when Argon is present a wavelength of one-thousand-forty-eight (1048) Angstroms can be produced. Photons of a specified wavelength have associated therewith a certain energy related to tire frequency thereof by Planck's constant. That is:

ENERGY=(PLANCK'S CONSTANT)×(FREQUENCY)

where FREQUENCY is related to the WAVELENGTH of the photons through the velocity of propagation of said photons in the present gas:

VELOCITY=(FREQUENCY)×-(WAVELENGTH), where Planck's constant is 6.624 times ten-to-the-minus-thirty-forth Joule-second.

It will then be appreciated that the shorter the wavelength, the more energetic will be the produced photons. This is the case as wavelength and frequency are inversely related and energy is directly proportional to frequency. Different sample molecules, atoms and/or other fragments require photons of different energy levels to cause ionization thereof. That is, for instance, sample ionized by photons produced in a Krypton gas containing lamp might not be ionized by photons produced by a Xenon containing lamp. Stated otherwise, more energetic photons are capable of removing more tightly held electrons from sample than are less energetic photons.

With the above in mind it should be readily appearant that a multiple lamp photoionization system, each of which said multiple lamps is capable of producing photons of a wavelength which differs from the wavelenght of said other lamps, would be of utility when analysis of an unknown sample is to be undertaken. Application of relatively long wavelength photons might be first applied to said sample and detection of any produced ionization undertaken, for instance. Progressively more energetic, shorter wavelength, photons could then be applied to said sample accompanied by additional detection of produced sample ionization. Analysis of single component or multiple component samples could be performed by the technique alluded to.

A problem exists, however, in that physical separation of multiple photon production source lamps makes application of photons produced by each, to a location at which a sample is present, difficult. One solution to the problem is to cause the sample to flow past a number of photon sources. A search of Patents has provided U.S. Pat. No. 2,901,625 to Friedman et al. in which this approach is disclosed. In particular said Patent describes a tube through which a multiple component sample containing gas is caused to flow. Said multiple component sample containing gas is caused to pass between a set of spaced plates, each of which plates is held at a different DC potential, simultaneous with irradiation by photons produced in a closely situated Xenon containing lamp. Detection of any current through said set of spaced plates held at differing DC potentials is simultaneously undertaken and if present indicates the presence of electrons which result when said sample is ionized. Said multiple component sample containing gas is then caused to pass between a second set of spaced plates each of which are held at a different DC potential, simultaneous with irradiation with photons produced by a lamp containing Krypton. Detection of current flowing through said second set of spaced plates again indicates that sample ionization has occurred. It is mentioned that one identified application of the system is in measuring the relative amount of xylene in toluene as Xenon photons are capable of ionizing xylene but not toluene. While the Friedman et al. invention allows application of photons of multiple wavelengths to a sample, it requires the presence of multiple detector systems and a tube through which sample containing gas is caused to flow. This invention can then De cumbersome to practice. Other Patents which describe the presence of multiple sources of radiation are U.S. Pat. Nos. 4,762,402 to Michon et al. and 4,648,951 to Maya. Another Patent, U.S. Pat. No. 5,126,676 to Huston describes a system in which a magnesium fluoride window is present in a system which provides a single source of radiation. Said magnesium fluoride window is utilized as it is transparent to photons with wavelengths between one-hundred-twenty (120) nanometers, (i.e. twelve-hundred (1200) Angstroms), and one-thousand (1000) nanometers, (i.e. ten-thousand (10,000) Angstroms). Magnesium fluoride then is transparent to photons produced by electric discharge in Xenon, Krypton and Argon gasses.

Other Patents which describe the construction of a sample analysis system include a Patent to Fay, U.S. Pat. No. 2,943,223. An elongated hollow dielectric member with spaced electrodes therein is described. During use a sample containing gas is caused to flow through said structure between said spaced electrodes, while an electric discharge takes place. While both ends of the elongated hollow dielectric member are closed, at least one is transparent to radiation. A Patent to Braman et al, U.S. Pat. No. 3,612,686 describes a sample analysis system construction in which electrodes are placed at the ends of an elongated Pyrex brand glass or quartz capillary tube, through which elongated quartz capillary tube sample containing gas is caused to flow during use while a direct current discharge carried out between said electrodes. The electrodes can be of a wire type, or of a hollow tube design. Photon radiation produced exits through the wall of the Pyrex brand glass or quartz capillary tube and into a detector.

A Patent which describe construction of gas discharge lamps is U.S. Pat. No. Re. 33,415 to Jelic. The system therein provides that electrodes should be placed into a sealed cylindrical envelope, said spaced electrodes being oriented parallel to one another, and said electrodes having a partition therebetween. A magnesium fluoride window to allow emission of photon radiation produced in said structure by electric discharge between said electrodes is described. A Patent to Dahlquist et al., U.S. Pat. No. 3,685,911 describes a capillary arc plasma source system in which a lithium fluoride window is present to allow photon radiation produced therein to escape. Lithium fluoride is transparent to radiation with wavelengths as low as eleven-hundred (1100) Angstroms. Other Patents which describe gas discharge tubes are U.S. Pat. Nos. 3,900,237 to Marcucci, 3,390,351 to Bell and 4,001,624 to Cosco et al. A particularly interesting Patent is U.S. Pat. No. 5,062,116 to Christensen. This Patent describes a halogen-compatable high-frequency discharge apparatus. Discharge tubes formed of metal fluoride glasses, (note that glasses are amorphous), are used in apparatus for emitting high frequency laser and fluorescent light. The use of metal fluoride glasses serves to make the discharge tubes resistant to corrosion from halogen-containing gas mixtures subjected to high frequency excitation in the apparatus.

The cited Patents show that use of multiple sources of ionizing photon radiation in the analysis of samples is known. Also, while the use of magnesium or lithium fluoride as a material which is transparent to photons with wavelengths between one-hundred (100) (for lithium fluoride) of one-hundred-twenty (120) (for magnesium fluoride) nanometers and one-thousand (1000) nanometers is known, no reference of which the inventor is aware teaches that multiple sources of photon radiation should be encased in a containing structure made of machinable photon radiation transparent material such as crystaline magnesium or lithium fluoride. Were such a system available, photons of different wavelengths produced in different lamps encased at different locations in said containing machinable photon radiation transparent material could easily be applied to a sample at a fixed location without significant attenuation thereof. As well, no reference of which the inventor is aware teaches that photon producing lamps can be fabricated directly in machinable photon radiation transparent material such as crystaline magnesium or lithium fluoride with said machinable photon radiation transparent material serving to directly contain gas pumped into evacuated cavities which are machined thereinto. A need is thus identified.

DISCLOSURE OF THE INVENTION

The present invention is comprised of a system of one or more photoionization lamp(s) of a conventional or preferred embodiment, said photoionization lamps being contained in a machinable photon radiation transparent block of material.

Said system is unique in that a single, a plurality or a multiplicity of photoionization lamps are contained in a block of machinable photon radiation transparent material, typically crystalline magnesium or lithium fluoride, into which has been machined photoionization lamp containing holes.

As stated in the Background Section of this Disclosure, crystalline magnesium or lithium fluoride is transparent to photons of wavelengths between one-hundred-twenty (120 1) (for magnesium fluoride), one-hundred-ten (110) (for lithium fluoride) and one-thousand (1000) nanometers. As a result, photons of a wavelength within said ranges produced in a lamp anywhere in a containing block of crystalline magnesium or lithium fluoride can pass essentially unattenuated out of said block of crystalline magnesium or lithium fluoride, where not blocked by the presence of other photoionization lamps for instance. Said photons, produced anywhere in said block of crystalline magnesium or lithium fluoride can then be relatively easily applied at a location at which sample is present. That is, sample need not be transported from location to location to be exposed to photons from said various lamps.

A preferred embodiment of a photon producing lamp provides that a first hole be machined through a block of machinable photon radiation transparent material such as crystalline magnesium or lithium fluoride from one side thereof therethrough to another side thereof, and that an additional hole be machined into said block to provide access to said first machined hole. (Note that the term "block" can include other than rectangular shapes). The ends of said first machined hole being sized for and fitted with electrodes such that a gas tight seal is achieved between said electrodes and the inner wall of said first machined hole at each end thereof. In use said first machined hole is evacuated by a vacuum pump via said second machined hole, and then a gas such as Argon, Krypton or Xenon is entered into said first machined hole at a desired pressure, via said second machined hole. Said second machined hole is then sealed so that said entered gas is secured within said first and second machined holes. Electrode protecting disks can also be present at the centermost oriented ends of said electrodes to prevent said entered gas from contacting said electrodes. Application of electrical energy to said electrodes then causes production of photons of known, entered gas specific, wavelength in the identified photon lamps. Said photons, it will be appreciated, will be free to escape from the majority of the body of said block of machinable photon radiation transparent material, such as crystalline magnesium or lithium fluoride, essentially unattenuated. Simply positioning a sample near said block of machinable photon radiation transparent material will be sufficient to expose said sample to said produced photons.

While a plurality or multiplicity of said preferred embodiment lamps can be formed in a block of machinable photon radiation transparent material, an alternate embodiment for a multiple photoionization lamp system provides that a block of machinable photon transparent material simply have a plurality or multiplicity of holes machined thereinto and that conventional photon producing lamps simply be positioned therein.

The present invention can also provide heater elements in additional machined holes in the block of machinable photon transparent material, and can provide a machined channel through which sample is flowed during use, said channel perhaps being lined with some other material such as by insertion of a sample carrying tube, or the present invention can provide a separate sample containing system, preferably made from machinable photon radiation transparent material such as crystalline magnesium or lithium fluoride.

The present invention will be better appreciated by reference to the Detailed Description Section of this Disclosure.

SUMMARY OF THE INVENTION

Photoionization lamps in which a gas contained therein is subjected to excitation by electrical discharge via electrodes, to produce sample ionizing photons of a desired wavelength, are known. Application of produced photons of more than one wavelength to sample typically requires that said sample be caused to flow into close proximity with respect to one photoionization lamp, then another etc., and application of multiple, different wavelength photons to a stationary sample can therefore present a problem. That is, photons produced by variously located photoionization lamps become variously attenuated when traveling to a location of a sample and typical photoionization lamps can not be conveniently positioned sufficiently close to one another to overcome the problem. This is the case as photoionization lamp supporting means tend to be somewhat cumbersome and can even serve to block various of produced photons from effectively reaching a stationary sample.

A compact system of photoionization lamps which provides a plurality or multiplicity of photoionization lamps in close proximity to one another without the need for photon radiation opaque supporting means would therefore be provide utility.

The present invention provides that one or more photoionization lamps should be contained in a block of machinable photon radiation transparent material, such as crystalline magnesium or lithium fluoride.

The present invention also provides a preferred embodiment for a photoionization lamp fabricated in a block of photon radiation transparent material, although systems containing more than one photoionization lamp can be constructed by inclusion of conventional photoionization lamps in holes machined into a block of photon radiation transparent material.

It is therefore a purpose of the present invention to teach a preferred embodiment for realization of photoionization lamps.

It is another purpose of the present invention to teach a compact, convenient to use, system of one or more photoionization lamps contained in holes machined into a block of photon radiation transparent material such as crystalline magnesium or lithium fluoride.

DETAILED DESCRIPTION

Figure 1:
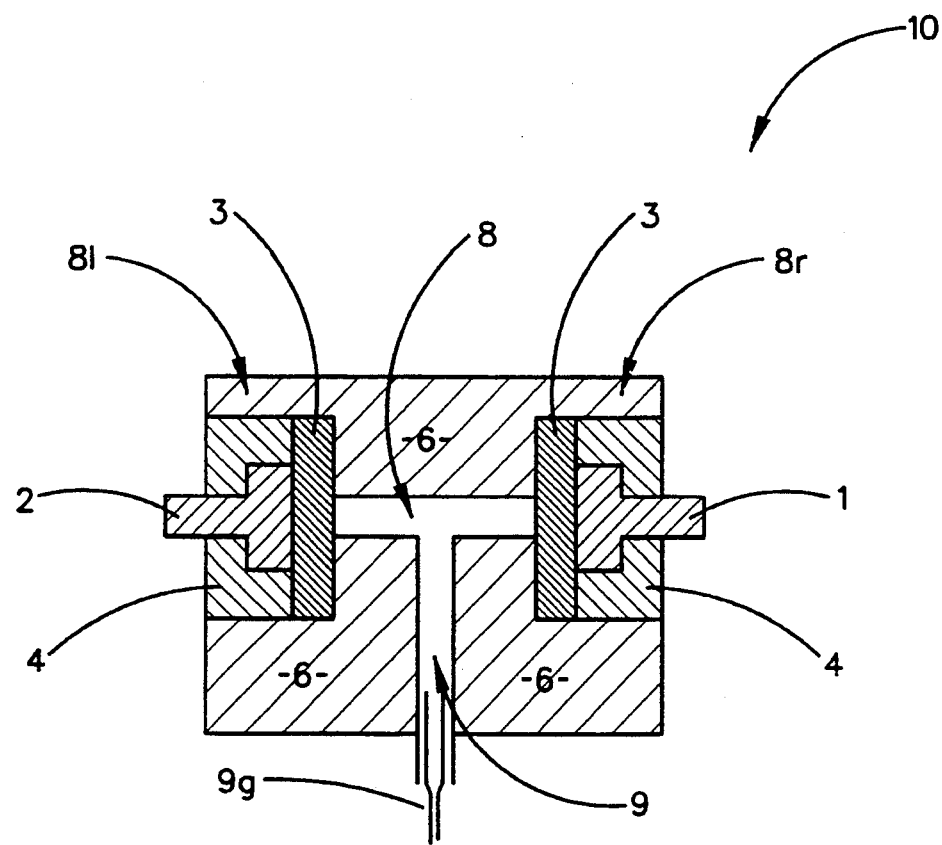
FIG. 1 shows a cross-sectional view of a preferred embodiment of the photoionization lamp of the present invention.

Turning now to the Drawings, there is shown in FIG. 1 a present invention preferred embodiment of a photoionization lamp (10). Shown is a block (6) of photon radiation transparent material, typically crystalline magnesium or lithium fluoride, through which has been machined a first hole (8) from one side thereof therethrough to another side thereof with the ends (8r) and (8l) of said machined first hole being sized for and fitted with electrodes (1) and (2). Said electrodes (1) and (2) are placed into the ends (8r) and (8l) of said first machined hole (8). Disks (3) are shown at the centrally located ends of said electrodes (1) and (2) and sealing means (4) are shown securing and sealing said electrodes (8r) and (8l) against the external atmosphere. Said disks (3) and sealing means (4) serve to secure the electrodes (1) and (2) in place and protect said electrodes (1) and (2) against contact with outside atmosphere or a gas entered into first machined hole (8), as described directly. Second machined hole (9) is shown providing access to said first machined hole (8). A tube (9g), typically made of soft glass, is also shown extending from said second machined hole (9). In use tube (9g) first mediates attachment of said second machined hole (9) to a vacuum pump, use of which serves to evacuate said first machined hole (8). Tube (9g) then mediates provision of a gas into said first machined hole (8). When said gas has been caused to flow into said first machined hole (8) and is present therein at a desired pressure, tube (9g) can be sealed to secure said gas therein. Application of electrical energy to electrodes (1) and (2) then causes emission of photons of a definite wavelength from excited gas molecules. If block (6), is transparent to said photons they will be emitted from said block (6) without significant attenuation in all direction except those blocked by the presence of the electrodes (1) and (2) and any other obstruction which might be present. Other obstruction can include heating means, not shown and other photoionization lamps, for instance. It is specifically mentioned that photons emitted by Argon, Krypton and Xenon all pass through crystalline magnesium or lithium fluoride essentially unattenuated.

Figure 2:
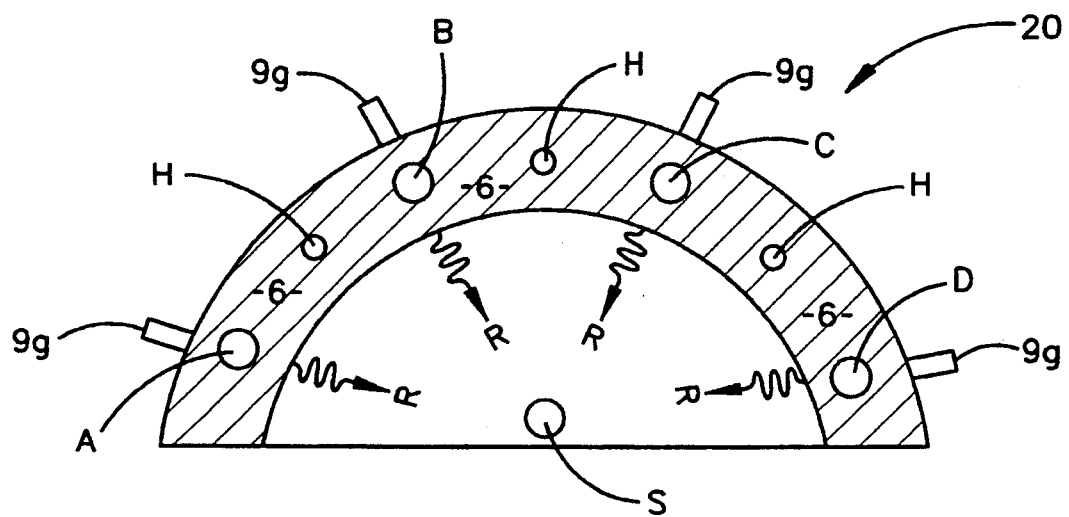
FIG. 2 demonstrates a multiple photoionization lamp system of the present invention.

Continuing, a plurality or multiplicity of photoionization lamps as described above can be fabricated in a single block of machinable photon radiation transparent material such as crystalline magnesium or lithium fluoride, for instance, each being filled with a different photon wavelength producing gas. The specific geometry of such a multiple system is not particularly critical, with the only requirement being that photons developed in a photoionization lamp not be obstructed as they pass through the containing block of machinable photon radiation transparent material toward a sample. However, it is mentioned that a block (6) of machinable photon radiation transparent material such as crystalline magnesium or lithium fluoride machined into a circular or half-circular shape, might be desirable. Each tube (9g) being oriented so as to project from a convex side thereof with holes (8) being inside and "facing" the concave side of said machined block of machinable photon radiation transparent material. A source of sample located at the focal point of the concave side of said circular or half circular shape would be easily subjected to photons emitted from any of said photoionization lamps. FIG. 2 shows a top view of a half-circular shaped system (20), with photoionization lamps "A", "B", "C" and "D" therein. Shown also are tubes (9g) projecting from each of said photoionization lamps "A", "B", "C" and "D". Sample "S" is shown present at the focal point of the half circular shape, configured as described above. Sample "S" can be contained in a separate container or in an integral portion of the block (6) of photon radiation transparent material which houses the photoionization lamps. Emitted Photon radiation "R" is also indicated. It is emphasized that FIG. 2 is demonstrative and not limiting. That is, the present invention can be embodied in any functional geometric arrangement.

It is to be understood as well, that a block of machinable photon radiation transparent material, such as crystalline magnesium or lithium fluoride can have one, a plurality or a multiplicity of holes machined thereinto, with each said machined hole being fitted with a conventional photoionization lamp, to form a single or multiple photoionization system. That is, the preferred embodiment of photoionization lamp is not absolutely necessary to practice the present invention. That is, in FIG. 2 photoionization lamps "A", "B", "C" and "D" might be conventional photoionization lamps, and tubes (9g) not present. Other variations might include the presence of heater elements "H".

It should then be appearant that the present invention is found in the use of a machined block of photon radiation transparent material, typically crystalline magnesium or lithium fluoride, to contain photoionization lamps so that photons emitted from said photoionization lamps during use can exit said containing block of photon radiation transparent material essentially unattenuated over a majority of the body of said containing block of radiation transparent material. The present invention is also found in a preferred embodiment of a photoionization lamp which is fabricated primarily from machinable photon radiation transparent material.

Having hereby disclosed the subject matter of the present invention, it should be obvious that many modifications, substitutions, and variations of the present invention are possible in light of the teachings. It is therefore to be understood that the invention can be practiced other than as specifically described, and should be limited in breadth and scope only by the claims.

I claim:

1. A photoionization lamp of the type including a contained gas and electrodes for providing electrical excitation thereto, in which the improvement comprises fabrication thereof in a block of machinable photon radiation transparent material such that said contained gas and electrodes are contained directly within a hole machined thereinto without the need for additional gas containing elements in said machined hole other than gas entry sealing means, and such that during use, radiation produced therein by application or electrical energy to said electrodes can escape therefrom in essentially any direction not blocked by said electrodes.

2. A photoionization lamp as in claim 1, in which the machinable photon radiation transparent material is selected from the group consisting of crystalline magnesium fluoride and crystalline lithium fluoride.

3. A photoionization lamp comprising a block of photon radiation transparent material in which a first hole is machined from one side thereof therethrough to another side thereof, with said first machined hole being accessible through a second machined hole in said block of machinable photon radiation transparent material, the ends of said first machinable hole being sized for and fitted with electrodes, said electrodes being sealed into the ends of said first machined hole; such that said first machined hole can be evacuated and then filled with a selected gas by way of said second machined hole, which second machined hole can then be sealed such that said contained gas and electrodes are directly within said first machined hole without the need for additional gas containing elements, and such that during use, radiation produced therein by application of electrical energy to said electrodes can escape therefrom in essentially any direction not blocked by said electrodes.

4. A photoionization lamp as in claim 3, in which the machinable photon radiation transparent material is selected from the group consisting of crystalline magnesium fluoride and crystalline lithium fluoride.

5. A multiple photoionization lamp system comprising more than one photoionization lamp contained in a block of machinable photon radiation transparent material, each said photoionization lamp comprising:

a first hole machined into said block of machinable photon radiation transparent material, from one side thereof therethrough to another side thereof, with said first machined hole being accessible through a second machined hole in said block of machinable photon radiation transparent material, the ends of said first machined hole being sized for and fitted with electrodes, said electrodes being sealed into the ends of said first machined hole; such that said first machined hole can be evacuated and then filled with a selected gas by way of said second machined hole, which second machined hole can then be sealed to provide gas and electrodes contained directly within said first machined hole without the need for additional gas containing elements in said first machined hole, such that during use, radiation produced by application of electrical energy to said electrodes therein can escape therefrom in essentially any direction not blocked by said electrodes.

6. A multiple photoionization lamp as in claim 5, in which the machinable photon radiation transparent material is selected from the group consisting of crystalline magnesium fluoride and crystalline lithium fluoride.

7. A method of providing ionizing photons to a sample comprising the steps of:

a. obtaining a photoionization lamp of the type including a contained gas and electrodes for providing electrical excitation thereto, in which the improvement comprises fabrication thereof in a block of machinable photon radiation transparent material such that said contained gas and electrodes are contained directly within a hole machined thereinto without the need for additional gas containing elements in said machined hole other than gas entry sealing means, and such that during use, radiation produced therein by application of electrical energy to said electrodes can escape therefrom in essentially any direction not blocked by said electrodes;

b. positioning a sample with respect thereto; and c. applying electrical energy to said electrodes.

* * * * *